(12) United States Patent
Yamamoto et al.

(10) Patent No.: US 7,105,959 B2
(45) Date of Patent: Sep. 12, 2006

(54) COOLING JACKET AND MOTOR UNIT WITH COOLING JACKET

(75) Inventors: Tomonaga Yamamoto, Fujiyoshida (JP); Takuya Maeda, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 119 days.

(21) Appl. No.: 10/689,745

(22) Filed: Oct. 22, 2003

(65) Prior Publication Data

US 2004/0080220 A1    Apr. 29, 2004

(30) Foreign Application Priority Data

Oct. 24, 2002    (JP)    ............... 2002-309579

(51) Int. Cl.
*H02K 9/00*    (2006.01)
*H02K 5/20*    (2006.01)

(52) U.S. Cl. .................. 310/52; 310/54; 310/57; 310/64

(58) Field of Classification Search .................. 310/52, 310/54, 112, 57, 64
See application file for complete search history.

(56) References Cited

U.S. PATENT DOCUMENTS

| | | | | |
|---|---|---|---|---|
| 1,405,616 A | * | 2/1922 | Mossay | 310/57 |
| 2,228,105 A | * | 1/1941 | Baudry et al. | 310/57 |
| 2,338,154 A | * | 1/1944 | Wilkinson | 310/54 |
| 2,417,686 A | * | 3/1947 | Hugin | 310/93 |
| 2,663,807 A | * | 12/1953 | Baudry | 310/53 |
| 3,127,530 A | * | 3/1964 | White | 310/54 |
| 3,218,491 A | * | 11/1965 | Walsh et al. | 310/57 |
| 3,404,722 A | * | 10/1968 | Bloore | 159/23 |
| 3,447,002 A | * | 5/1969 | Ronnevig | 310/54 |
| 3,448,798 A | * | 6/1969 | Coe | 165/168 |
| 3,505,548 A | * | 4/1970 | Seesselberg et al. | 310/95 |
| 3,681,628 A | * | 8/1972 | Krastchew | 310/54 |
| 4,213,498 A | | 7/1980 | Vandenbosshe | |
| 5,448,118 A | | 9/1995 | Nakamura et al. | |
| 5,500,563 A | * | 3/1996 | Kawaguchi et al. | 310/71 |

(Continued)

FOREIGN PATENT DOCUMENTS

DE    19604643 A1  *  8/1997

(Continued)

OTHER PUBLICATIONS

EP Search Report for corresponding EP Application NO. 03256649.9-2207 dated Feb. 7, 2005.

(Continued)

*Primary Examiner*—Burton S. Mullins
*Assistant Examiner*—Yahveh Comas
(74) *Attorney, Agent, or Firm*—Staas & Halsey LLP

(57) ABSTRACT

A cooling jacket for an electric motor and a motor unit with a cooling jacket mounted on an electric motor having simple structure and capable of being manufactured with reduced number of processes. A cooling pipe made of copper and the like is bent, and held by plate members and lid members, and resin having high heat-conductivity is filled in between to form a series of segments of the cooling jacket. Adjacent ones of the segments are connected with each other by connecting members to form the cooling jacket. The plate members are formed to conform with a shape of the electric motor. The series of segments are mounted on an outer surface of the electric motor and gaps between the adjacent segments are adjusted to bring the plate members into close contact with the outer surface of the electric motor. Since the cooling jacket is mounted on the electric motor after finishing the manufacturing of the electric motor, the electric motor is easily provided with cooling structure with reduced number of manufacturing processes.

6 Claims, 3 Drawing Sheets

U.S. PATENT DOCUMENTS

| | | | |
|---|---|---|---|
| 5,787,114 A * | 7/1998 | Ramamurthy et al. | 375/221 |
| 5,906,236 A | 5/1999 | Adams et al. | |
| 5,973,427 A * | 10/1999 | Suzuki et al. | 310/54 |
| 6,501,653 B1 * | 12/2002 | Landsgestell et al. | 361/699 |
| 6,731,028 B1 * | 5/2004 | Derleth et al. | 310/52 |
| 6,802,671 B1 * | 10/2004 | Badie et al. | 405/129.55 |
| 7,049,716 B1 * | 5/2006 | Grundl et al. | 310/52 |

FOREIGN PATENT DOCUMENTS

| | | |
|---|---|---|
| DE | 19950660 A1 | 10/2000 |
| EP | 0631365 A2 | 12/1994 |
| JP | 52071609 A * | 6/1977 |
| JP | 01-198243 | 8/1989 |
| JP | 04-304145 | 10/1992 |
| JP | 05-103445 | 4/1993 |
| JP | 06315246 A * | 11/1994 |
| JP | 7-67290 | 3/1995 |
| JP | 08-3322170 | 12/1996 |
| JP | 09-201000 | 7/1997 |
| JP | 9-201000 | 7/1997 |
| JP | 09-201010 | 7/1997 |
| JP | 09201000 A * | 7/1997 |
| JP | 09-285072 | 10/1997 |
| JP | 09-308183 | 11/1997 |
| JP | 11-248324 | 9/1999 |
| JP | 2001-045701 | 2/2001 |
| JP | 2001-346362 | 12/2001 |
| JP | 2002-119019 | 4/2002 |
| JP | 2002-541463 | 12/2002 |
| WO | WO 00/24111 | 4/2000 |
| WO | 20 00/60609 | 10/2000 |

OTHER PUBLICATIONS

Notice of Grounds for Rejection Office Action dated Jul. 5, 2005 concerning Japanese Patent Application No. 309579/2002.

* cited by examiner

COOLING JACKET AND MOTOR UNIT WITH COOLING JACKET

BACKGROUND OF THE INVENTION

1. Field of the Invention

The present invention relates to a cooling jacket for an electric motor and a motor unit having a cooling jacket mounted on an electric motor.

2. Description of Related Art

There have been developed various cooling structures for cooling an electric motor by providing passages of coolant such as water at a circumference of the electric motor.

As one of these structures, a structure for cooling an electric motor by coolant passages formed in an outer casing of the electric motor is known from JP 5-103445A, JP 9-285072A, JP 2002-119019A, for example. Further, an electric motor with cooling structure in which a cooling jacket for flowing coolant is arranged between a frame and a stator core of the electric motor is known from JP 2001-45701A.

In the structure where coolant passages are formed in the outer casing of the electric motor, it is necessary to machine the coolant passages in the casing of the electric motor so that a large number of machining processes is required to increase the manufacturing cost. Regarding the structure where the cooling jacket having coolant passages is arranged between the frame and the stator core, this structure is complicated and requires a large number of manufacturing processes to increase the manufacturing cost.

Further, there is known an electric motor in which a jacket having coolant passages is arranged around a cylindrical outer frame of an electric motor and is fastened at both ends by fasteners to be fit to the outer frame, and liquid synthetic resin mixed with adhesive or aluminum powder is filled between the jacket and the outer frame to expedite heat conduction in between, as disclosed in JP 9-201000A and JP 9-201010A.

In this structure, the jacket has to be prepared specific to the electric motor to increase the manufacturing cost. Further, it is possible to fasten the jacket onto the electric motor having a cylindrical outer frame in close contact therewith, but it is difficult to fasten the jacket closely onto an outer frame of a shape other than a cylindrical shape. Even in a case of the electric motor having the cylindrical frame, if the jacket abuts on the outer frame not evenly, close contact of the jacket and the outer frame is greatly decreased.

SUMMARY OF THE INVENTION

A cooling jacket for an electric motor of the present invention comprises: a cooling pipe for flowing coolant; a plate member having one surface supporting the cooling pipe; fastening means for fastening said plate member on the electric motor such that the other surface of the plate member abuts on the outer surface of the electric motor.

The plate member may be divided into a plurality of plate segments, and the fastening means may comprise connecting members for connecting adjacent ones of the plate segments and having adjustors for adjusting gaps between the adjacent ones of the plate segments.

Each of the adjustors may comprise an elongated through hole formed on the connecting member and a screw.

The other surfaces of the plate segments to be abutted on the outer surface of the electric motor may be formed to conform with a shape of the electric motor to be in close contact with the outer surfaces of the electric motor, and a lid member for covering the cooling pipe may be provided in confronting relation to the plate member. Resin having heat conductivity may be filled between the plate member and the lid member. The plate member may have grooves for supporting the cooling pipe.

At least one cooling jacket as described above is mounted on an outer surface of an electric motor to constitute a motor unit of the present invention.

DETAILED DESCRIPTION

Figure 1:
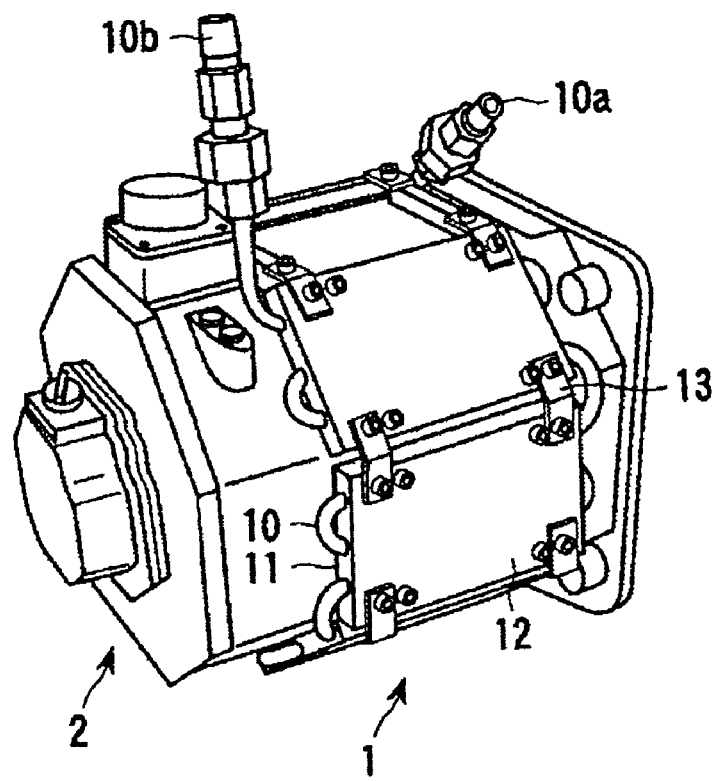
FIG. 1 is a perspective view of a motor unit constituted by an electric motor and a cooling jacket mounted thereon according to an embodiment of the present invention.

FIG. 1 shows an embodiment of the present invention where a cooling jacket 1 is mounted on an electric motor 2 in the shape of an octagonal prism having octangular cross section. The cooling jacket 1 comprises a cooling pipe 10 having an inlet 10a and an outlet 10b of coolant, plate members 11 for supporting the cooling pipe 10 and for heat conduction between the cooling pipe 10 and a casing of the electric motor 2, lid members 12 and connecting members 13.

Figure 2:
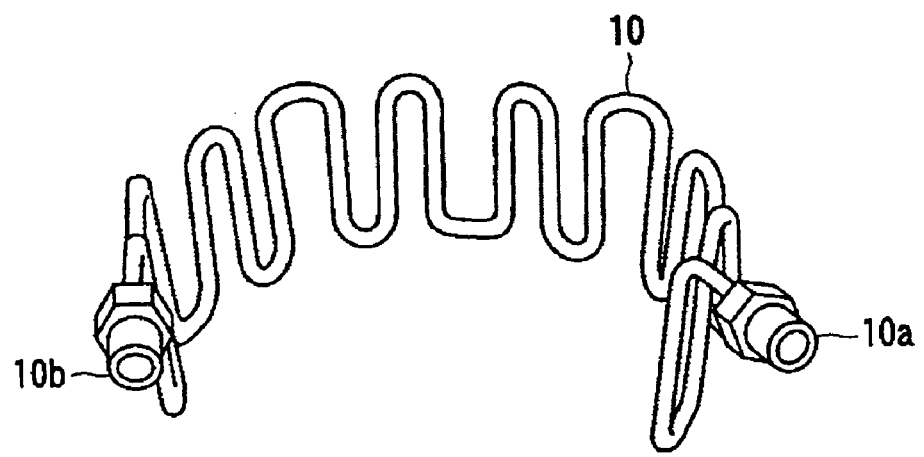
FIG. 2 is a perspective view of a cooling pipe of the cooling jacket as shown in FIG. 1.

As shown in FIG. 2, the cooling pipe 10 is made of material having flexibility and high heat conductivity such as copper and formed into a shape to approximately conform with a shape of the electric motor 2.

Figure 3:
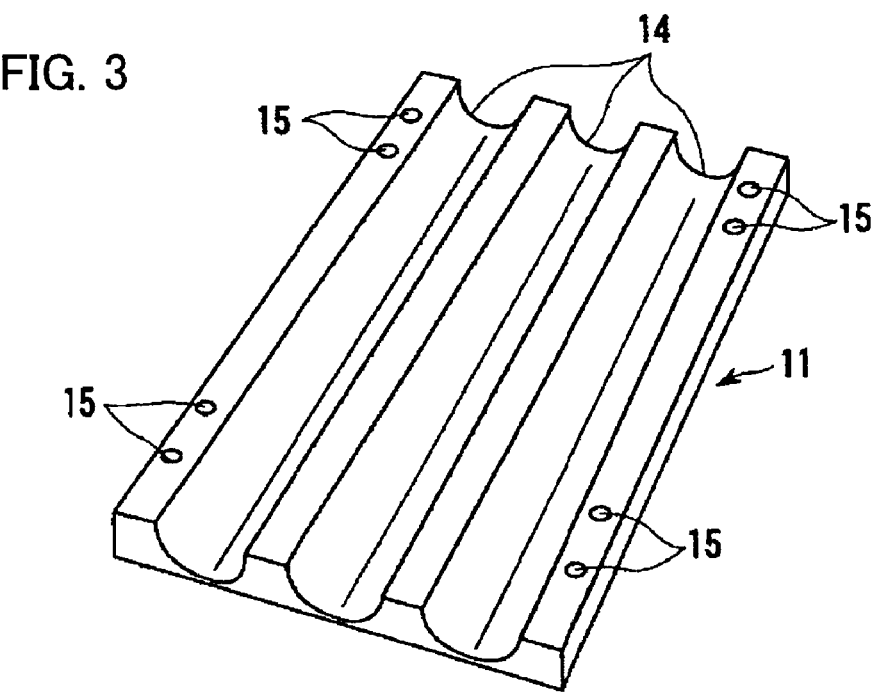
FIG. 3 is a perspective view of a plate member for supporting the cooling pipe.

An enlarged perspective view of the plate member 11 is shown in FIG. 3. The plate member 11 has grooves 14 for arranging the cooling pipe 10 on a surface of one side thereof. Four pairs of screw holes 15 having female threads formed therein for engagement with bolts are formed at corners of the plate member 11.

Figure 4:
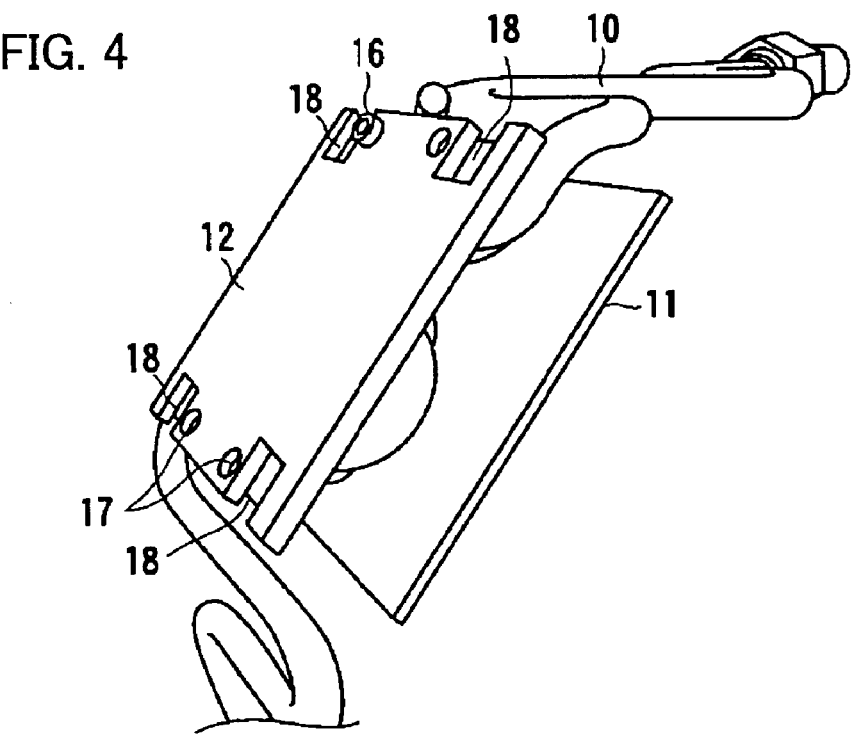
FIG. 4 is a perspective view showing assembling of the plate member and a lid member onto the cooling pipe to form a segment of the cooling jacket.
Figure 5:
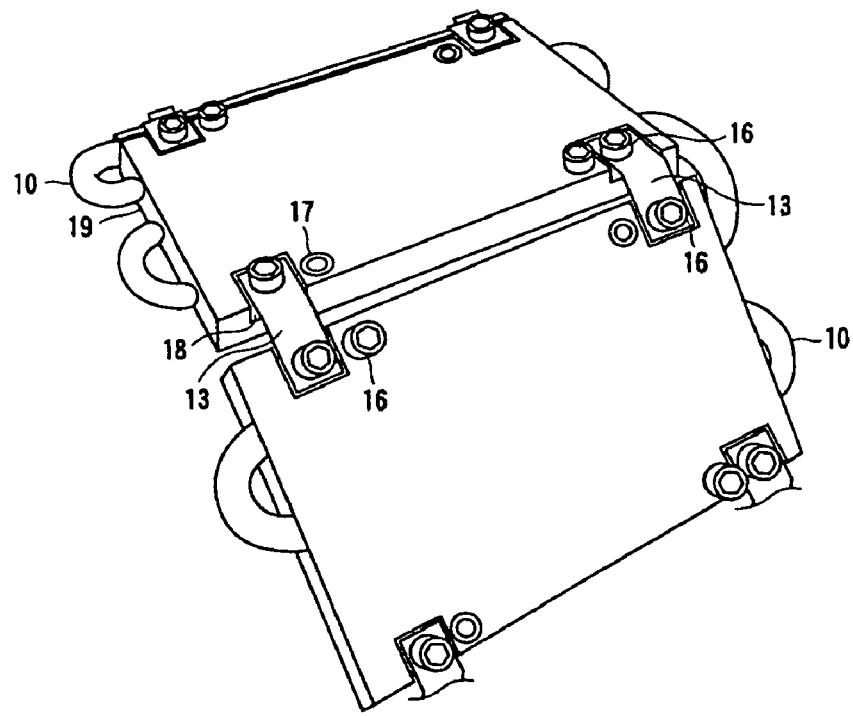
FIG. 5 is a perspective view showing connection between adjacent ones of segments of the cooling jacket.

Assembling of the cooling pipe 10, the plate members 11 and the lid members 12 into the cooling jacket 1 will be described referring to FIG. 4. The plate member 11 is placed such that straight portions of the cooling pipe 10 are fit into the grooves 14 of the plate member 11, and covered by the lid member 12. Then, bolts 16 are inserted into through holes 17 formed on the lid member 12 and rotated to be engaged with the screw holes 15 of the plate member 11, so that the cooling pipe 10 is held between the plate member 11 and the lid member 12. Then, resin 19 having high heat conductivity such as synthetic resin with aluminum power mixed, as shown in FIG. 5, is filled between the plate member 11 and the lid member 12 to be coagulated. Thus, a segment of the cooling jacket 1 constituted by a part of the cooling pipe 10, the plate member 11 and the lid member 12 is formed. The plate members 11 and the lid members 12 are successively assembled to the cooling pipe 10 in the same manner to form a series of seven segments of the cooling jacket 1 in this embodiment.

FIG. 5 shows connection between adjacent segments of the cooling jacket 1. Four recesses 18 are formed at corner portions of each of the lid members 12, and adjacent ones of the segments are connected with each other by angled (L-shaped) connecting members 13. The connection member 13 has an elongated through hole at each end portion thereof, and a bolt 16 is inserted into the elongated through hole positioned at the recess 18 of the lid member 12 to be engaged with female threads formed on the plate member 11, so that the adjacent segments are connected with each other.

Figure 6:
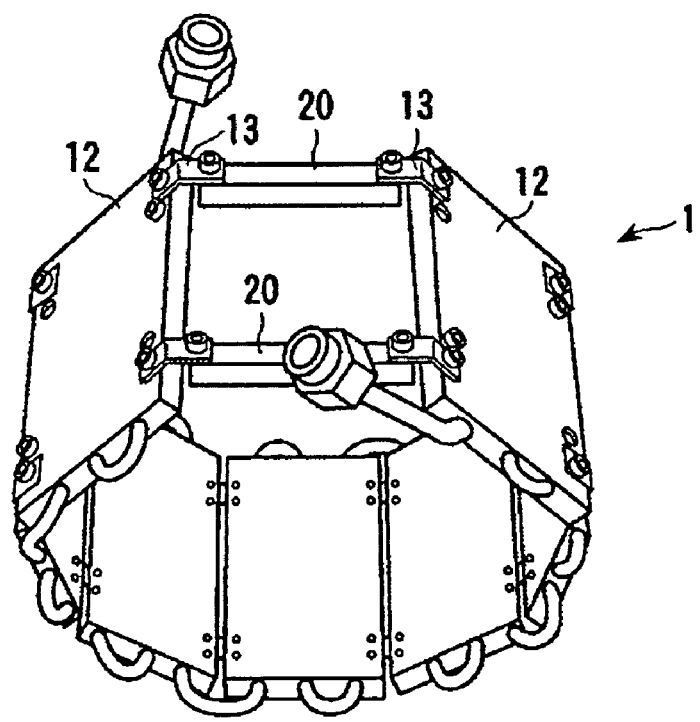
FIG. 6 is an entire perspective view of the cooling jacket constituted by the series of the connected segments.

An entire perspective view of the assembled cooling jacket 1 constituted by the series of segments is shown in FIG. 6. Ends of the series of segments of the cooling jacket 1 are connected by the connecting members 13 using termination members 20 to form an annular shape of the cooling jacket 1.

The series of segments of the cooling jacket 1 are mounted around the electric motor 2 and the ends of the cooling jacket 1 are connected with each other by the connecting members 13 using the termination member 20. Then, gaps between the adjacent segments are adjusted by moving the bolts 16 in the elongated through holes of the connecting members 13, so that inner surfaces of the plate members 11 on which the grooves 14 are not formed abut on the outer surface of the electric motor 2 in close contact therewith. Thus, the gap between the adjacent segments are adjusted by an adjustor comprising the elongated holes formed on the connecting members 13 and the bolts 16, so that the plate members 11 come in close contact with the outer surfaces of the electric motor 2. In this adjustment, the cooling pipe 10 between the adjacent segments may be slightly deformed but the cooling pipe 10 is deformable to an extent to allow the adjustment since the cooling pipe 10 is made of material having flexibility such as copper.

Further, since the plate member is constituted by divided segments of plate members 11 to conform with the outer shape of the electric motor 2 in the embodiment, nonuniform contact between the plate members 11 and the outer faces of the electric motor 2 is eliminated so that the segmented plate members are in close contact with the outer faces of the electric motor to achieve effective heat conduction. According to experiments, it is confirmed that an electric motor with the cooling jacket thereon has a rated power as one and half times larger than an electric motor without the cooling jacket.

In the foregoing embodiment, the cooling jacket 1 is designed to conform the electric motor 2 having a shape of an octangular prism. If the electric motor has a shape other than octangular prism, shapes and the numbers of the plate members 11 are designed to conform with the shape of the electric motor. For example, in the case of an electric motor having a cylindrical shape, plate members having cylindrical inner surfaces are used to conform with the cylindrical outer surface of the electric motor. In this case, the cylindrical outer surface of the electric motor is covered by the plate members and gaps between the plate members are adjusted in the same manner as described to eliminate nonuniform contact with the outer surface of the electric motor.

Further in the forgoing embodiment, the straight grooves 14 are formed on the plate members 11 to be fit to straight portions of the cooling pipe 10. Grooves may be formed to conform with curved portions of the cooling pipe 10 to accommodate the curved portions as well as the straight portions. Also in the foregoing embodiment, the outer face of the plate members 11 are entirely covered by the lid members 12. Alternatively, retainers for retaining the cooling pipe 10 in the grooves may be arranged periodically along the grooves.

Furthermore, in the case where an axial length of the electric motor is considerably long, a plurality of cooling jackets may be arranged along an axis of the electric motor so as to cover the outer surfaces for improving the cooling performance.

As described above, since the cooling jacket is not built in the electric motor but mounted on the electric motor after manufacturing thereof, machining for forming a cooling structure in the electric motor is not necessary to easily provide the electric motor with a cooling structure with reduced number of manufacturing processes. The cooling jackets can be constituted by general-purpose cooling pipes available in market to lower the manufacturing cost.

What is claimed is:

1. A cooling jacket to be mounted on an outer surface of an electric motor for cooling the electric motor, comprising:
    a cooling pipe for flowing coolant;
    a plate member having one surface supporting said cooling pipe and another surface uniformly conforming to the outer surface of the electric motor;
    fastening means for fastening said plate member on the electric motor such that the other surface of the plate member abuts on the outer surface of the electric motor,
    wherein said plate member is divided into a plurality of plate segments, and said fastening means comprises connecting members for connecting adjacent ones of the plate segments and having adjustors for adjusting gaps between the adjacent ones of the plate segments.

2. A cooling jacket according to claim 1, wherein each of said adjustors comprises an elongated though hole formed on the connecting member and a screw.

3. A cooling jacket according to claim 1, wherein the other surfaces of the plate segments to be abutted on the outer surface of the electric motor are formed to conform with a shape of the electric motor to be in close contact with the outer surfaces of the electric motor.

4. A cooling jacket according to claim 1, further comprising a lid member for covering said cooling pipe in confronting relation to the plate member.

5. A cooling jacket according to claim 4, wherein resin having heat conductivity is filled between said plate member and said lid member.

6. A cooling jacket according to claim 1, wherein said plate member has grooves for supporting said cooling pipe.

* * * * *